US008050292B2

(12) United States Patent
Wu (10) Patent No.: US 8,050,292 B2
(45) Date of Patent: Nov. 1, 2011

(54) METHOD OF PERFORMING TRANSMISSION AND PRIORITIZATION FOR RADIO LINK CONTROL PACKETS FOR A MEDIUM ACCESS CONTROL LAYER OF A WIRELESS COMMUNICATIONS SYSTEM

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 709 days.

(21) Appl. No.: 12/164,116

(22) Filed: Jun. 30, 2008

(65) Prior Publication Data
US 2009/0323601 A1 Dec. 31, 2009

(51) Int. Cl.
H04J 3/16 (2006.01)
(52) U.S. Cl. ....................................................... 370/470
(58) Field of Classification Search .................... None
See application file for complete search history.

(56) References Cited

U.S. PATENT DOCUMENTS

| 2006/0209896 | A1* | 9/2006 | Choi et al. ................ 370/469 |
| 2007/0081513 | A1* | 4/2007 | Torsner ...................... 370/349 |
| 2008/0225893 | A1* | 9/2008 | Cave et al. ................ 370/476 |
| 2009/0086659 | A1* | 4/2009 | Pani et al. ................. 370/310 |
| 2009/0086709 | A1* | 4/2009 | Pani et al. ................. 370/349 |
| 2009/0103511 | A1* | 4/2009 | Marinier et al. ........... 370/345 |
| 2009/0225711 | A1* | 9/2009 | Sammour et al. ......... 370/329 |
| 2009/0238124 | A1* | 9/2009 | Pragada et al. ............ 370/329 |
| 2009/0323671 | A1* | 12/2009 | Wu ............................. 370/352 |
| 2010/0208749 | A1* | 8/2010 | Chun et al. ................. 370/474 |
| 2010/0254480 | A1* | 10/2010 | Park et al. .................. 375/295 |
| 2010/0309892 | A1* | 12/2010 | Torsner et al. ............. 370/336 |

FOREIGN PATENT DOCUMENTS

| EP | 2 076 088 A1 | 7/2009 |
| EP | 2 094 049 A2 | 8/2009 |
| EP | 2 094 049 A3 | 8/2010 |
| WO | 2005034418 A1 | 4/2005 |
| WO | 2009097273 A1 | 8/2009 |

OTHER PUBLICATIONS

3GPP, 3GPP TS draft 36.322 v8.1.0 update2, Mar. 2008.
3GPP, 3GPP TS draft 36.321 v8.1.0, Mar. 2008.

(Continued)

Primary Examiner — Anh-Vu Ly
(74) Attorney, Agent, or Firm — Winston Hsu; Scott Margo (57) ABSTRACT

A method used in a medium access control, hereinafter called MAC, layer of a wireless communications system for performing transmission and prioritization for packets of a radio link control, hereinafter called RLC, layer including a plurality of RLC entities coupled to a plurality of logic channel includes determining a size of a MAC protocol data unit, hereinafter called PDU according to a grant provided by a lower layer, selecting MAC control elements for use in a MAC PDU header, determining MAC sub-headers for use in the MAC PDU header according to the selected MAC control elements, determining a total transmission payload size according to total sizes of the control elements and the MAC sub-headers, and then allocating a transmission payload size for each RLC entity according to the total transmission payload size, a data volume provided by each of the plurality of RLC entities, and logic channel priority.

15 Claims, 4 Drawing Sheets

OTHER PUBLICATIONS

3rd Generation Partnership Project; Technical Specification Group Radio Access Network; Evolved Universal Terrestrial Radio Access (E-UTRA) Medium Access Control (MAC) protocol specification (Release 8), 3GPP TS 36.321 V8.2.0 (May 2008), front page+ pp. 2-33, XP002554077, Sophia Antipolis Valbonne, France.

F.Delli Priscoli, C.Mannino and M.Muratore , Joined MAC Scheduling and Transport Format Choice for UMTS Uplink Transmission, Wireless Personal Communications (2006) 40:49-59, DOI:10.1007/s11277-006-9100-3, Jun. 2006, pp. 49-59, XP019455206, University of Rome, La Sapienza.

HTC Corporation: "Disassembly, Demultiplexing and Multiplexing functions", 3GPP TSG-RAN2 Meeting #65, R2-090988, Feb. 9-13, 2009, XP050323168, Athens, Greece.

QUALCOMM: "RLC Prioritization Scheme", 3GPP TSG-RAN WG2 Meeting #48, R2-051967, Aug. 29-Sep. 2, 2005, XP050129109, London, United Kingdom.

* cited by examiner

METHOD OF PERFORMING TRANSMISSION AND PRIORITIZATION FOR RADIO LINK CONTROL PACKETS FOR A MEDIUM ACCESS CONTROL LAYER OF A WIRELESS COMMUNICATIONS SYSTEM

BACKGROUND OF THE INVENTION

1. Field of the Invention

The present invention relates to a method for packet transmission and prioritization, and more particularly, to a method of performing transmission and prioritization for packets of a radio link control (RLC) layer for a medium access control (MAC) layer of a wireless communications system.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

A radio link control (RLC) layer is responsible for data transfer of radio bearers from an upper layer, Packet Data Convergence Protocol (PDCP) layer, and includes three transfer modes of Transparent Mode (TM), Unacknowledged Mode (UM) and Acknowledged Mode (AM). An RLC entity exchanges RLC service data units (SDUs) with upper layer and RLC protocol data units (PDUs) with its peer RLC entity via lower layers. An RLC PDU can either be an RLC data PDU or an RLC control PDU.

In the LTE system, a UM RLC entity is configured either as a transmitting UM RLC entity or a receiving UM RLC entity. The transmitting UM RLC entity receives RLC SDUs from upper layer and sends RLC PDUs to its peer receiving UM RLC entity via lower layers. The receiving UM RLC entity delivers RLC SDUs to upper layer and receives RLC PDUs from its peer transmitting UM RLC entity via lower layers. In addition, the transmitting UM RLC entity segments and/or concatenates RLC SDUs in accordance to a transport block (TB) size selected by lower layer at the particular transmission opportunity when forming UM data (UMD) PDUs from the RLC SDUs.

In the LTE system, an AM RLC entity, either in the E-UTRAN or in the UE, consists of a transmitting side and a receiving side and supports segmentation, retransmission, sequence check and other functions. The receiving side of the AM RLC entity delivers RLC SDUs to the upper layers and receives RLC PDUs from its peer AM RLC entity via the lower layer. The transmitting side of the AM RLC entity receives RLC SDUs from upper layers and delivers RLC PDUs to its peer AM RLC entity according to a TB size indicated by a medium access control (MAC) layer. In addition, the transmitting side of the AM RLC entity segments and/or concatenates RLC SDUs in accordance to the TB size selected by the MAC layer at the particular transmission opportunity when forming AM data (AMD) PDUs from the RLC SDUs.

In AM data transfer, the transmitting side of the AM RLC entity shall prioritize transmission of RLC control PDUs over RLC data PDUs and further prioritize retransmission of RLC data PDUs over transmission of new AMD PDUs. In retransmission, the transmitting side of an AM RLC entity delivers the AMD PDU if the AMD PDU can entirely fit into the TB of the particular transmission opportunity, otherwise segments the AMD PDU to form a new AMD PDU segment which can fit into the TB.

The MAC layer, a lower layer of the RLC layer supports functions of mapping between logical channels and transport channels, multiplexing, de-multiplexing, logical channel prioritization, transport format selection, and so on. An MAC entity of the MAC layer, performing the MAC functions, exchanges RLC PDUs, seen as MAC SDUs, with the RLC layer via logic channels and MAC PDUs with the physical layer via transport channels, such as an uplink shared channel (UL-SCH) or a downlink shared channel (DL-SCH). An MAC SDU can be an RLC data PDU, an RLC data PDU segment or an RLC control PDU. More specifically, the MAC entity multiplexes MAC SDUs from one or different logical channels onto the TB to be delivered to the physical layer on transport channels. Each MAC transmission is allocated with a transmission time interval (TTI).

In the logical channel prioritization of the MAC layer, a logical channel prioritization procedure is applied when a new transmission of a hybrid automatic repeat request (HARQ) process is performed. Each logical channel is given a Prioritized Bit Rate (PBR). The PBR is a rate like X bytes/s or Y bits/s. The logical channel prioritization procedure ensures that all the logical channels are served in a decreasing priority order up to their configured PBR, and if any resources remain, all the logical channels are served in a strict decreasing priority order until either the data for that logical channel or the UL grant is exhausted, whichever comes first.

A MAC PDU consists of a MAC header, zero or more MAC SDUs, zero or more MAC control elements, and optionally padding. Both the MAC header and the MAC SDUs are of variable sizes. The MAC PDU header consists of one or more MAC PDU sub-headers, each corresponding to either a MAC SDU, a MAC Control element or padding. MAC PDU sub-headers have the same order as the corresponding MAC SDUs, MAC Control elements and padding. The MAC control elements are always placed before any MAC SDU and padding. A maximum of one MAC PDU can be transmitted per TB per UE, and one or two TBs can be transmitted per TTI per UE.

According to the prior art, the MAC selects a TB size for an AM RLC entity, and the TB, onto which the MAC SDUs are multiplexed from one or different logical channels, has the same size as the MAC PDU does. In this situation, a problem of TB allocation for RLC entities is incurred in a scenario where more than one RLC entity have data to transmit and logical channels of these RLC entities are multiplexed in the DL-SCH or UL-SCH. For example, two RLC entities of a UE with equal logical channel priority have data to transmit and two logical channels of these RLC entities are multiplexed in UL-SCH. The MAC layer has to provide half the TB size for each of the RLC entities when both of the RLC entities have data, more than half the TB size, to transmission. Therefore, it is unreliable for the RLC SDUs to be segmented and/or concatenated only in accordance to the TB size selected by MAC. Also, it is unreliable for the AMD PDU for retransmission to be determined whether to be segmented only depended on whether the AMD PDU can entirely fit into the corresponding TB or not.

The prior art does not clearly specify how to decide the RLC data PDU size when the RLC control PDU transmission is transmitted in the same transmission opportunity. Furthermore, the current logical channel prioritization is not clearly defined in the prior art.

SUMMARY OF THE INVENTION

The present invention therefore provides a method and related apparatus of performing transmission and prioritization for packets of an RLC layer for a MAC layer of a wireless communications system.

The present invention discloses a method used in a MAC layer of a wireless communications system for performing transmission and prioritization for packets of an RLC layer comprising a plurality of RLC entities coupled to a plurality of logic channels, where the plurality of logic channel is used for transferring packets between the RLC layer and the MAC layer. The method includes determining a size of a MAC PDU including a MAC PDU header and at least a MAC SDU according to a grant provided by a communications layer lower than the MAC layer, selecting MAC control elements for use in the MAC PDU header, determining MAC sub-headers for use in the MAC PDU header according to the selected MAC control elements, determining a total transmission payload size according to a total size of the control elements and a total size of the MAC sub-headers, and allocating a transmission payload size for each of the plurality of RLC entities according to the total transmission payload size, a data volume provided by each of the plurality of RLC entities for transmission, and channel priority of the plurality of logic channels.

The present invention further discloses a method used in a MAC layer of a wireless communications system for performing transmission and prioritization for packets of an RLC layer. The method includes determining a size of a MAC SDU corresponding to an RLC control PDU, determining a size of a MAC SDU corresponding to an RLC data PDU, determining a size of a MAC SDU corresponding to an RLC data PDU segment, and prioritizing transmission of the RLC control PDU with the first priority, transmission of the RLC data PDU and the RLC data PDU segment for retransmission with the second priority, and transmission of the RLC PDU for a new transmission with the third priority.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
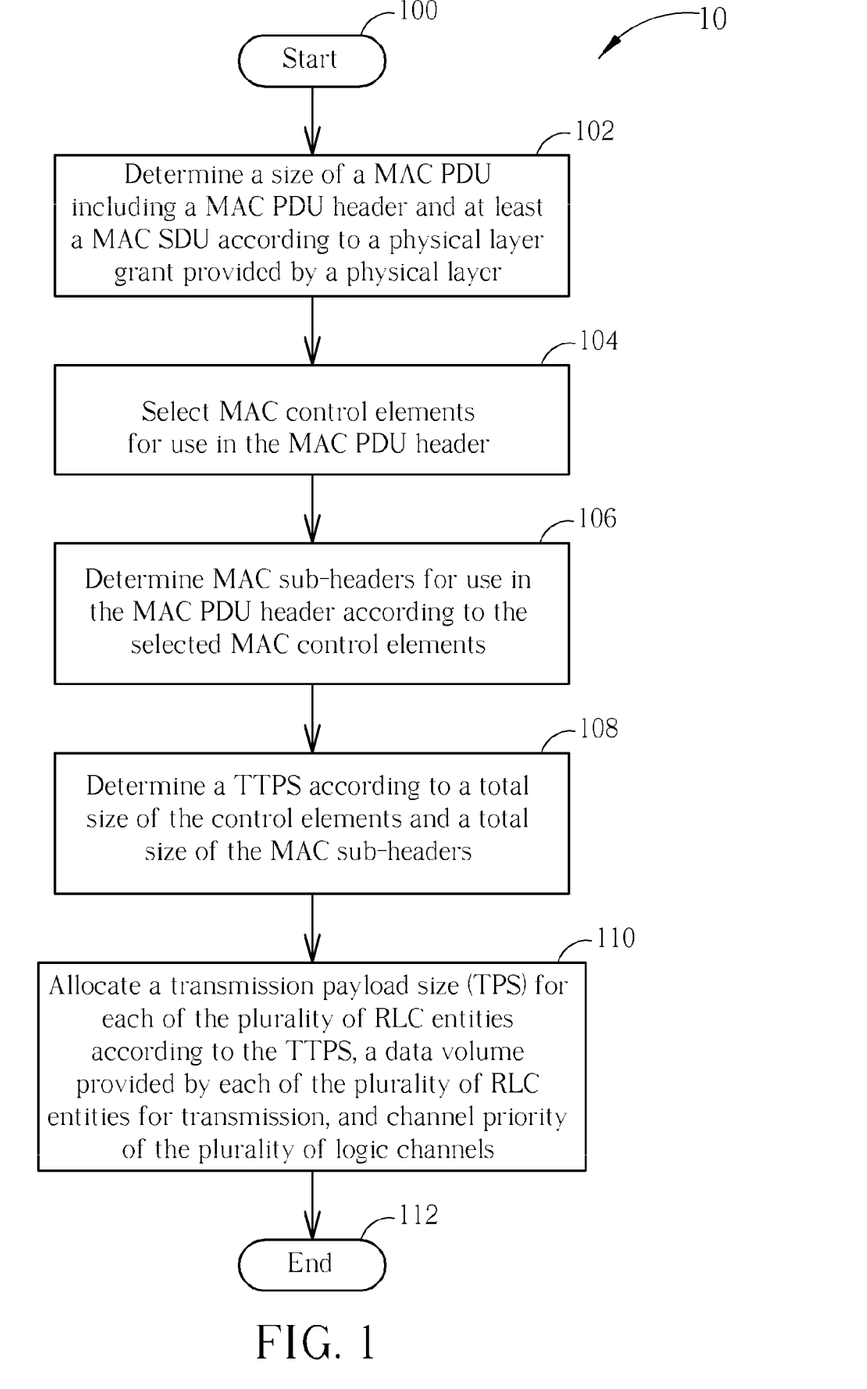
FIG. 1 illustrates a flowchart of a process according to an embodiment of the present invention.

Please refer to FIG. 1, which illustrates a flowchart of a process 10 according to an embodiment of the present invention. The process 10 is applied to a MAC layer of a communications system, such as long-term evolution (LTE) wireless communications system, and used for performing transmission and prioritization for RLC packets of an RLC layer including a plurality of RLC entities coupled to a plurality of logic channel transferring packets between the RLC layer and the MAC layer. The RLC entity preferably operates in AM or UM and the RLC packets can be RLC control PDUs, RLC data PDUs and RLC data PDU segments. The process 10 includes the following steps:

Step 100: Start.

Step 102: Determine a size of a MAC PDU including a MAC PDU header and at least a MAC SDU according to a physical layer grant provided by a physical layer.

Step 104: Select MAC control elements for use in the MAC PDU header.

Step 106: Determine MAC sub-headers for use in the MAC PDU header according to the selected MAC control elements.

Step 108: Determine a total transmission payload size (TTPS) according to a total size of the control elements and a total size of the MAC sub-headers.

Step 110: Allocate a transmission payload size (TPS) for each of the plurality of RLC entities according to the TTPS, a data volume provided by each of the plurality of RLC entities for transmission, and channel priority of the plurality of logic channels.

Step 112: End.

According to the process 10, the MAC PDU size, as well as a TB size, is determined according to the physical layer grant including bandwidth, modulation, coding scheme, and so on, in the next transmission timing. Each MAC SDU in the MAC PDU is preferably an RLC control PDU, an RLC data PDU or an RLC data PDU segment. The control elements included in the MAC PDU header and related MAC sub-headers are selected in the next transmission timing as well. The TTPS is determined for the plurality of AM or UM RLC entities according to the total size of the control elements and the total size of the MAC sub-headers. Preferably, the TTPS is determined to be (the MAC PDU size—the total size of the control elements—the total size of the MAC sub-headers). One TPS is allocated for each RLC entity according to the TTPS, the RLC data volume provided by each of the plurality of RLC entities for transmission, and the channel priority of the plurality of logic channels. In other words, the whole size of the MAC SDUs in the MAC PDU is the sum of the TPSs allocated to all the RLC entities.

Preferably, the TPS consist of a first payload size TPS1 for the first round TPS allocation and a second payload size TPS2 for the second round TPS allocation. When the sum of all the first payload sizes corresponding to the plurality of RLC entities fits the TTPS after all the plurality of RLC entities have been served for packet transmission in the first round, the second round of the TPS allocation will not be performed, and thereby the second payload size for each of the plurality of RLC entities is determined to be zero.

In addition, the TPS allocation for the plurality of RLC entities is performed from the highest channel priority level to the lowest channel priority level. Each logic channel is given a prioritized bit rate (PBR) whose value varies depended on the corresponding logic channel priority level.

Figure 2:
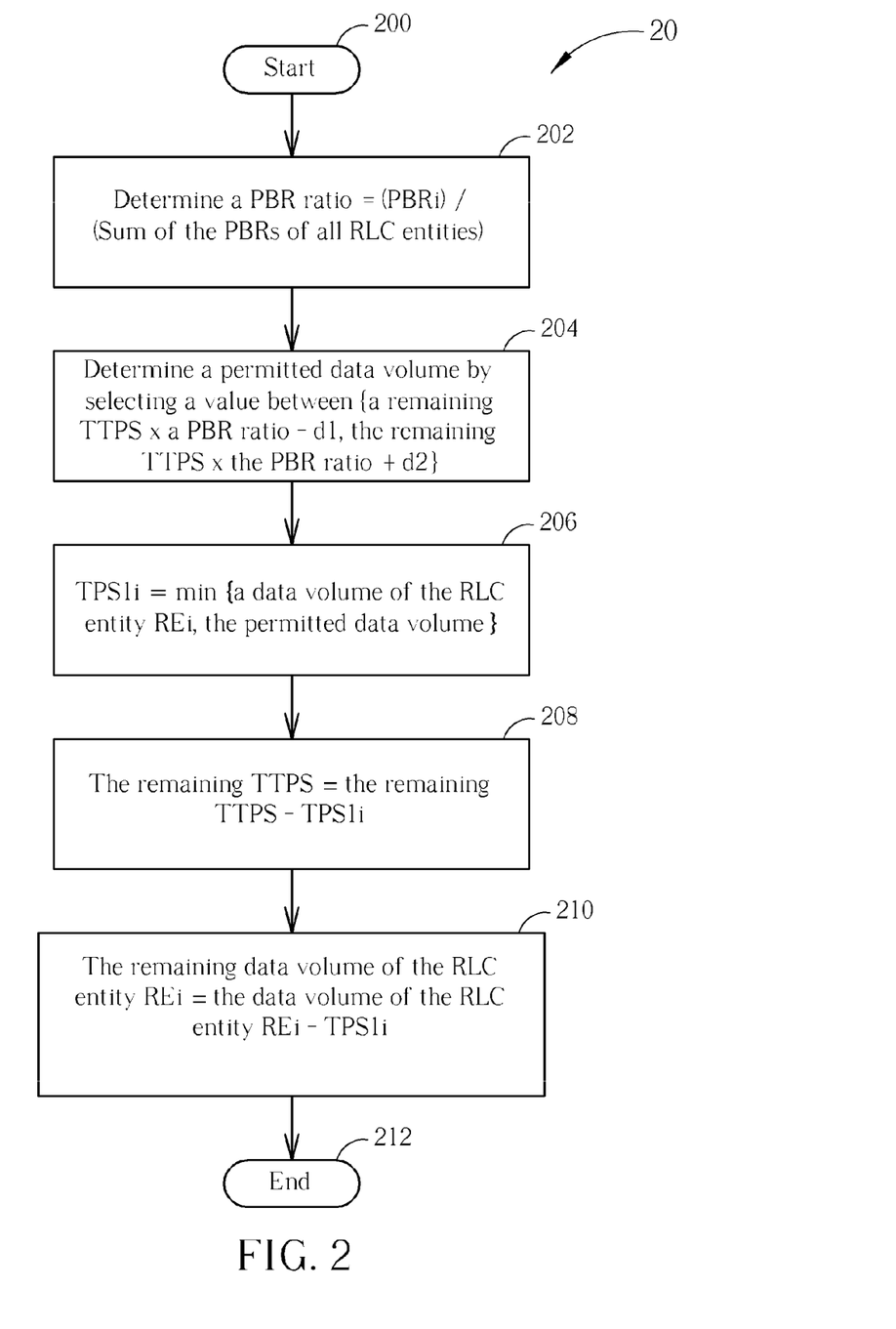
FIG. 2 illustrates a flowchart of a payload size determining process used in the process of FIG. 1 according to an embodiment of the present invention.

Please refer to FIG. 2, which illustrates a flowchart of a process 20 used in the process 10 according to an embodiment of the present invention. The process 20 is applied to an RLC entity REi corresponding to a logical channel priority i and a prioritized bit rate PBRi for deriving the first payload size TPS1$i$, where i is 1 to the number of the RLC entities. The process 20 includes the following steps:

Step 200: Start.

Step 202: Determine a PBR ratio=(PBRi)/(Sum of the PBRs of all RLC entities).

Step 204: Determine a permitted data volume by selecting a value between {a remaining TTPS×a PBR ratio−d1, the remaining TTPS×the PBR ratio+d2}.

Step 206: TPS1$i$=min {a data volume of the RLC entity REi, the permitted data volume}.

Step 208: The remaining TTPS=the remaining TTPS−TPS1$i$.

Step 210: The remaining data volume of the RLC entity REi=the data volume of the RLC entity REi−TPS1$i$.

Step 212: End.

In the abovementioned steps, d1 and d2 are tolerance volumes, preferably ratios of (the remaining TTPS×the PBR ratio), such as 5% of (the remaining TTPS×the PBR ratio). The tolerances d1 and d2 can be equal. For example, if the RLC entity REi has 65 byte data to transmit and the result of (the remaining TTPS×the PBR ratio) is 64 bytes, the d2 can be adjusted to be larger than 1. Therefore, the possible maximum value of the permitted data volume is lifted to 65 bytes, and TPS1$i$ can be allocated with 65-byte capacity, exactly enough for the data needed to be transmitted.

TPS1$i$ is the minimum data volume of the data volume of the RLC entity REi and the permitted data volume determined in Step 204. For the RLC entity REi, the remaining data volume is obtained by deducting the TPS1$i$ from the data volume of the RLC entity REi. Similarly, the remaining TTPS is a remaining payload size obtained by deducting all the TPS1$s$, allocated for the RLC entities whose priorities are higher than the RLC entity REi, from the TTPS. The initial value of the remaining TTPS is the TTPS value. For the first RLC entity to be served, the remaining TTPS is equal to the TTPS.

When the RLC entity REi executes the process 20, the remaining TTPS obtained at Step 208 is reused by next RLC entity for the remaining TTPS of Step 204. For example, the TTPS is 100 bytes with 30-byte TPS1$_1$ allocated to the RLC entity RE1 and the data volume of the RLC entity RE1 is 120 bytes. In this situation, when the RLC entity RE1 executes the process 20, the calculation result of the remaining TTPS, which is left for the RLC entity RE2 to use in Step 204, is (100−30)=70 bytes. The calculation result of the remaining data volume of the RLC entity RE1 in step 210 is (120−30)=90 bytes. The RLC entity RE2 and the RLC entities with lower priority levels execute the process 20 in the same way as the RLC entity RE1.

Preferably, the total data volume is a summed volume of the RLC control PDUs, MAC sub-headers corresponding to the RLC control PDUs, RLC PDUs for retransmission, MAC sub-headers corresponding to the RLC PDUs for retransmission, RLC PDU segments for retransmission, MAC sub-headers corresponding to the RLC PDU segments for retransmission, one new RLC PDU, and a MAC sub-header corresponding to the new RLC PDU. Alternatively, the total RLC data volume is a summed volume of the RLC control PDUs, RLC PDUs for retransmission, RLC PDU segments for retransmission, and one new RLC PDU.

For data transfer priority in a logical channel, the RLC control PDU is the first order to be transferred to the MAC layer and included in the MAC PDU, the RLC PDU or the RLC PDU segment for retransmission is the second order, and the new RLC PDU is the third order.

Figure 3:
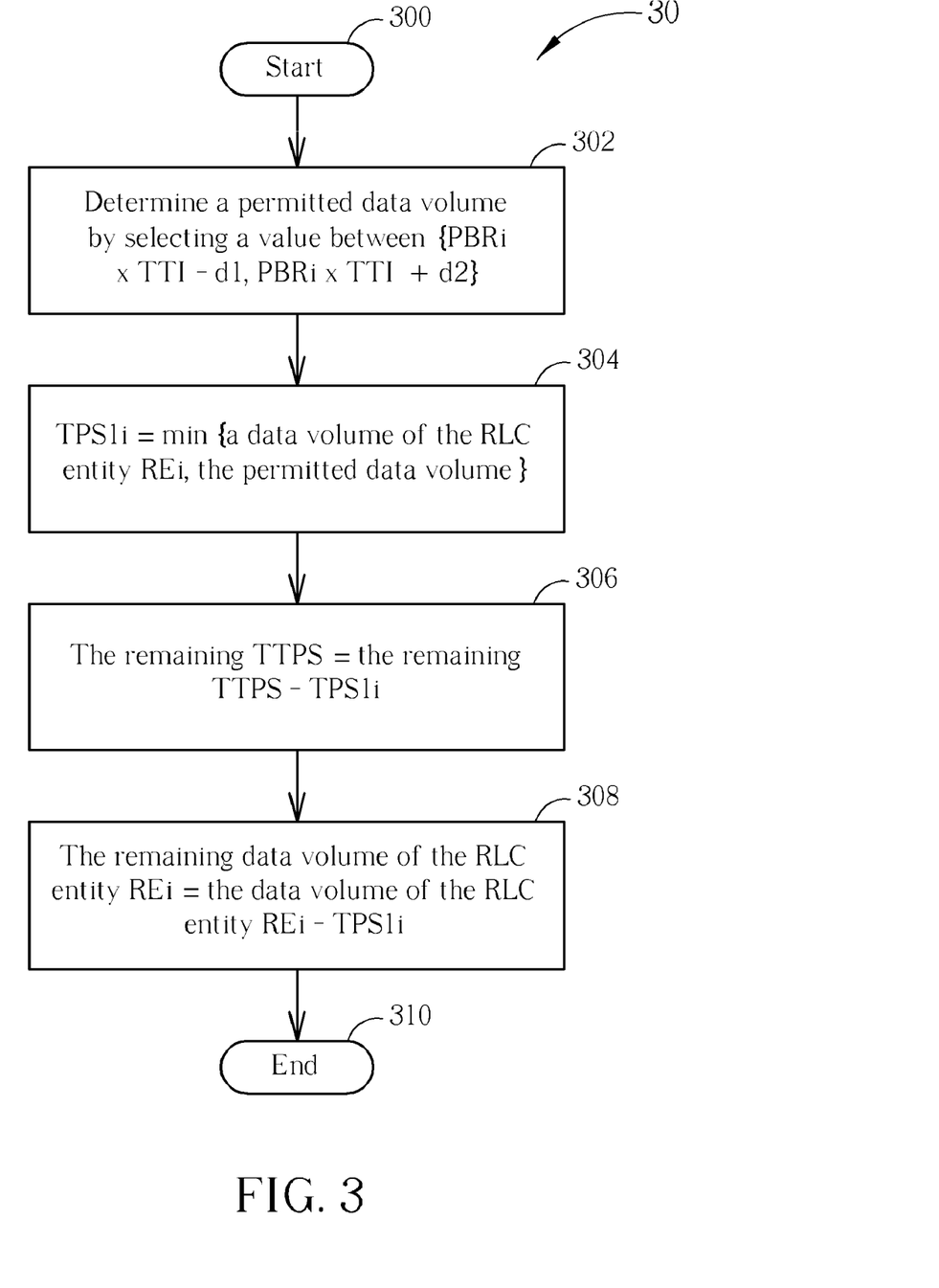
FIG. 3 illustrates a flowchart of a payload size determining process used in the process of FIG. 1 according to another embodiment of the present invention.

Please refer to FIG. 3, which illustrates a flowchart of a process 30 used in the process 10 according to another embodiment of the present invention. The process 30 is an alternative to the process 20, and thereby the corresponding symbols of the process 30 are defined in the same way as those of the process 20. The process 30 includes the following steps:

Step 300: Start.

Step 302: Determine a permitted data volume by selecting a value between {PBRi×TTI−d1, PBRi×TTI+d2}.

Step 304: TPS1$i$=min {a data volume of the RLC entity REi, the permitted data volume}.

Step 306: The remaining TTPS=the remaining TTPS−TPS1$i$.

Step 308: The remaining data volume of the RLC entity REi=the data volume of the RLC entity REi−TPS1$i$.

Step 310: End.

Compared to the process 20, no PBR ratio is used in the process 30, and the determination of the permitted data volume is changed to select the value between {PBRi×TTI−d1, PBRi×TTI+d2}. The rest of the process 30 works in the same way as the corresponding steps of the process 20 do, and therefore the related detailed explanation is omitted herein.

After all the TPS1$s$ are determined as well as the first round serving all the RLC entities, the sum of all the first payload sizes corresponding to the plurality of RLC entities may be equal to or smaller than the TTPS. When the sum of all the first payload sizes is equal to the TTPS, meaning that the TTPS is fully utilized, the second payload size TPS2 for each RLC entity is determined to be zero. As a result, the TPS for an RLC entity is exactly the first payload size TPS1. On the other hand, when the sum of all the first payload sizes is smaller than the TTPS, meaning that there is still remaining space in the TTPS, the second payload size TPS2 for each RLC entity has to be determined as well as the second round serving all the RLC entities, so as to fully utilize the TTPS.

Similar to the determination of the first payload size TPS1, the second payload size for each RLC entity is also determined from the highest channel priority level to the lowest channel priority level. The determination of a second payload size TPS2$i$ for an RLC entity REi corresponding to a logical channel priority i and a prioritized bit rate PBRi can be achieve by the followings:

TPS2$i$=min {the remaining data volume of the RLC entity REi, the remaining TTPS}; and The remaining TTPS 32 the remaining TTPS−TPS2$i$.

In the abovementioned determination, the second payload size TPS2$i$ uses a minimum data volume of the remaining data volume of the RLC entity REi and the remaining TTPS. In addition, the remaining TTPS used for the first-served RLC entity in the second round is the final volume left by the end of the first round using the process 20 or 30.

Figure 4:
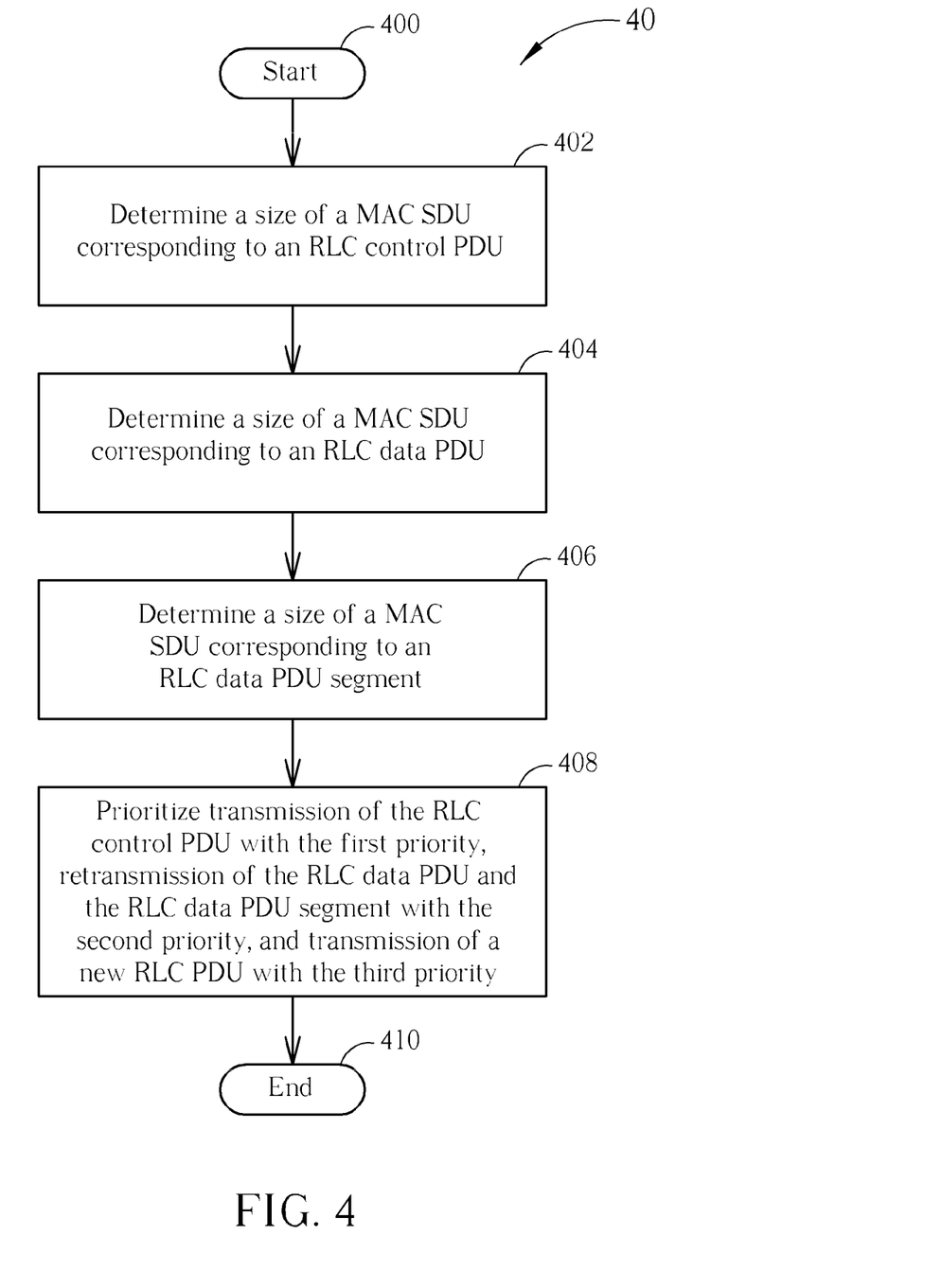
FIG. 4 illustrates a flowchart of a process according to an embodiment of the present invention.

Please refer to FIG. 4, which illustrates a flowchart of a process 40 according to an embodiment of the present invention. The process 40 is applied to the MAC layer of a communication system, such as LTE wireless communications system, for performing transmission and prioritization for RLC packets and includes the following steps:

Step 400: Start.

Step 402: Determine a size of a MAC SDU corresponding to an RLC control PDU.

Step 404: Determine a size of a MAC SDU corresponding to an RLC data PDU.

Step 406: Determine a size of a MAC SDU corresponding to an RLC data PDU segment.

Step 408: Prioritize transmission of the RLC control PDU with the first priority, retransmission of the RLC data PDU and the RLC data PDU segment with the second priority, and transmission of a new RLC PDU with the third priority.

Step 410: End.

According to the process 40, the MAC SDU sizes corresponding to the RLC control PDU, the RLC data PDU or the RLC data PDU segment are all determined in the MAC layer. Besides, the transmission of the RLC control PDU, the retransmission of the RLC data PDU and the RLC data PDU segment and the transmission of the new RLC PDU are prioritized with the first, second, and third priority, respectively.

Therefore, the RLC entity has to transmit data (ex. the RLC data PDUs or RLC control PDUs) according to the MAC SDU size determined through the process 40. In addition, the logic channel priority for transmission of the RLC data PDUs and RLC control PDUs is clearly determined in the MAC layer.

The method (ex. The process 10 including the process 20 or 30 or the process 40) of the present embodiment can also be embodied as computer program product on a computer readable recording medium. The computer readable recording medium is any data storage device that can store data which can be thereafter read by a processor of a computer system, such as the above-mentioned UE, UTRAN or Node-B. Examples of the computer readable recording medium include read-only memory (ROM), random-access memory (RAM), CD-ROMs, magnetic tapes, floppy disks, optical data storage devices, and carrier waves (such as data transmission through the Internet).

In conclusion, the embodiments of the present invention provides methods aiming to determine MAC SDU sizes for the RLC control PDU, RLC data PDU/PDU segment in the MAC layer, and furthermore allocate the payload sizes for the RLC entities according to the determined logic channel priority when the RLC control PDUs and the RLC data PDU need to be transmitted in the same opportunity.

Those skilled in the art will readily observe that numerous modifications and alterations of the device and method may be made while retaining the teachings of the invention.

What is claimed is:

1. A method used in a medium access control (MAC) layer of a wireless communications system for performing transmission and prioritization for packets of a radio link control (RLC) layer comprising a plurality of RLC entities coupled to a plurality of logical channel, the plurality of logical channel transferring packets between the RLC layer and the MAC layer, the method comprising:
   determining a size of a MAC protocol data unit (PDU) according to a grant provided by a communications layer lower than the MAC layer, the MAC PDU comprising a MAC PDU header and at least a MAC service data unit;
   selecting MAC control elements for use in the MAC PDU header;
   determining MAC sub-headers for use in the MAC PDU header according to the selected MAC control elements;
   determining a total transmission payload size according to a total size of the MAC control elements and a total size of the MAC sub-headers; and
   according to the total transmission payload size, a data volume provided by each of the plurality of RLC entities for transmission, and channel priority of the plurality of logical channels, allocating a transmission payload size for each of the plurality of RLC entities.

2. The method of claim 1, wherein, according to the total transmission payload size, the data volume provided by each of the plurality of RLC entities for transmission, and the channel priority of the plurality of logical channels, allocating the transmission payload size for each of the plurality of RLC entities comprises:
   allocating the transmission payload size comprising at least one of a first payload size and a second payload size for each of the plurality of RLC entities from the highest channel priority level to the lowest channel priority level;
   determining a permitted data volume for each of the plurality of RLC entities; and
   when the plurality of RLC entities are served for packet transmission for a first round, using a minimum data volume of the data volume of each of the plurality of RLC entities and the corresponding permitted data volume as the first payload size corresponding to a corresponding RLC entity.

3. The method of claim 2, wherein the permitted data volume is determined to be a value between a range whose lower bound is a remaining total transmission payload size multiplied by a prioritized bit rate ratio and then subtracting a first tolerance and whose upper bound is the remaining total transmission payload size multiplied by the prioritized bit rate ratio and then added with a second tolerance, wherein the prioritized bit rate corresponds to the priority of a corresponding logical channel, and the remaining total transmission payload size is a remaining data volume obtained by deducting all of the allocated transmission payload sizes corresponding to the higher priority levels from the total transmission payload size, and the prioritized bit rate ratio is obtained by a prioritized bit rate of the corresponding RLC entity dividing a sum of the prioritized bit rates of the plurality of RLC entities.

4. The method of claim 2, wherein the permitted data volume is determined to be a value between a range whose lower bound is a transmission time interval multiplied by a prioritized bit rate and then subtracting a first tolerance and whose upper bound is the transmission time interval multiplied by the prioritized bit rate and then added with a second tolerance, wherein the prioritized bit rate corresponds to the priority of a corresponding logical channel.

5. The method of claim 2, wherein the second payload size for each of the plurality of RLC entities is zero when the sum of all the first payload sizes corresponding to the plurality of RLC entities fits the total transmission payload size after all the plurality of RLC entities have been served for packet transmission in the first round.

6. The method of claim 2 further comprising determining the second payload size for each of the plurality of RLC entities when the sum of all the first payload sizes corresponding to the plurality of RLC entities is smaller than the total transmission payload size after all the plurality of RLC entities have been served for packet transmission in the first round.

7. The method of claim 6, wherein determining the second payload size for each of the plurality of RLC entities comprises:
   determining the second payload size for each of the plurality of RLC entities from the highest channel priority level to the lowest channel priority level; and
   using a minimum data volume of the remaining data volume of each of the plurality of RLC entities and a remaining total transmission payload size as the second payload size corresponding to a corresponding RLC entity;
   wherein the remaining data volume of each of the plurality of RLC entities is obtained by deducting the corresponding first payload size from the data volume of each of the plurality of RLC entities.

8. The method of claim 1, wherein the packets of the RLC layer comprises at least one of RLC control PDUs, RLC data PDUs and RLC data PDU segments.

9. The method of claim 8, wherein the at least a MAC service data unit is an RLC control PDU, an RLC data PDU or an RLC data PDU segment.

10. The method of claim 8, wherein the RLC control PDUs are the first order to be transferred to the MAC layer, the RLC data PDUs are the second priority to be transferred to the MAC layer and the RLC data PDU segments are the third priority to be transferred to the MAC layer.

11. The method of claim 10, wherein the data volume provided by each of the plurality of RLC entities for transmission is a summed volume of the RLC control PDUs, MAC sub-headers corresponding to the RLC control PDUs, RLC data PDUs for retransmission, MAC sub-headers corresponding to the RLC data PDUs for retransmission, RLC data PDU segments for retransmission, MAC sub-headers corresponding to the RLC data PDU segments for retransmission, one new RLC data PDU, and a MAC sub-header corresponding to the new RLC data PDU.

12. The method of claim 10, wherein the data volume provided by each of the plurality of RLC entities for transmission is a summed volume of the RLC control PDUs, RLC data PDUs for retransmission, RLC data PDU segments for retransmission, and one new RLC data PDU.

13. The method of claim 1, wherein determining the total transmission payload size according to the total size of the control elements and the total size of the MAC sub-headers comprises determining the total transmission payload size to be a payload size obtained by subtracting both of the total size of the control elements and the total size of the MAC sub-headers from the size of the MAC PDU.

14. The method of claim 1, wherein the plurality of RLC entities operates in an acknowledged mode or an unacknowledged mode.

15. A non-transitory computer readable medium embodied with computer executable instructions to be executed by a processor for performing the method of claim 1.

* * * * *